May 1, 1951   R. N. YOUNGBLOOD ET AL   2,550,898
MACHINE FOR USE IN MAKING FABRICS
Filed May 15, 1947   3 Sheets-Sheet 1

INVENTOR.
Robert N. Youngblood
William J. Kluge
BY
Parker, Crichnor & Farmer,
Attorneys.

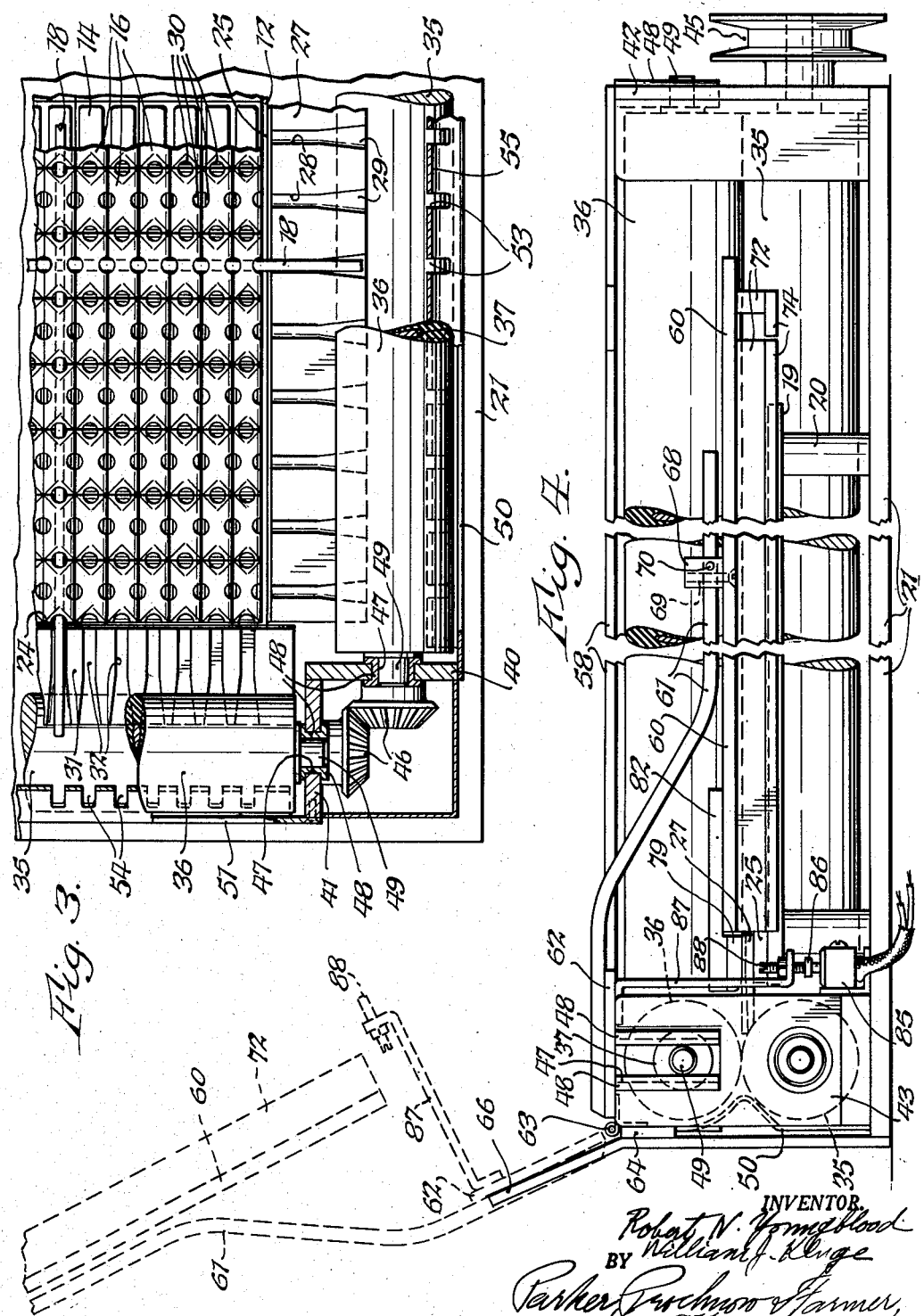

May 1, 1951  R. N. YOUNGBLOOD ET AL  2,550,898
MACHINE FOR USE IN MAKING FABRICS
Filed May 15, 1947  3 Sheets-Sheet 3
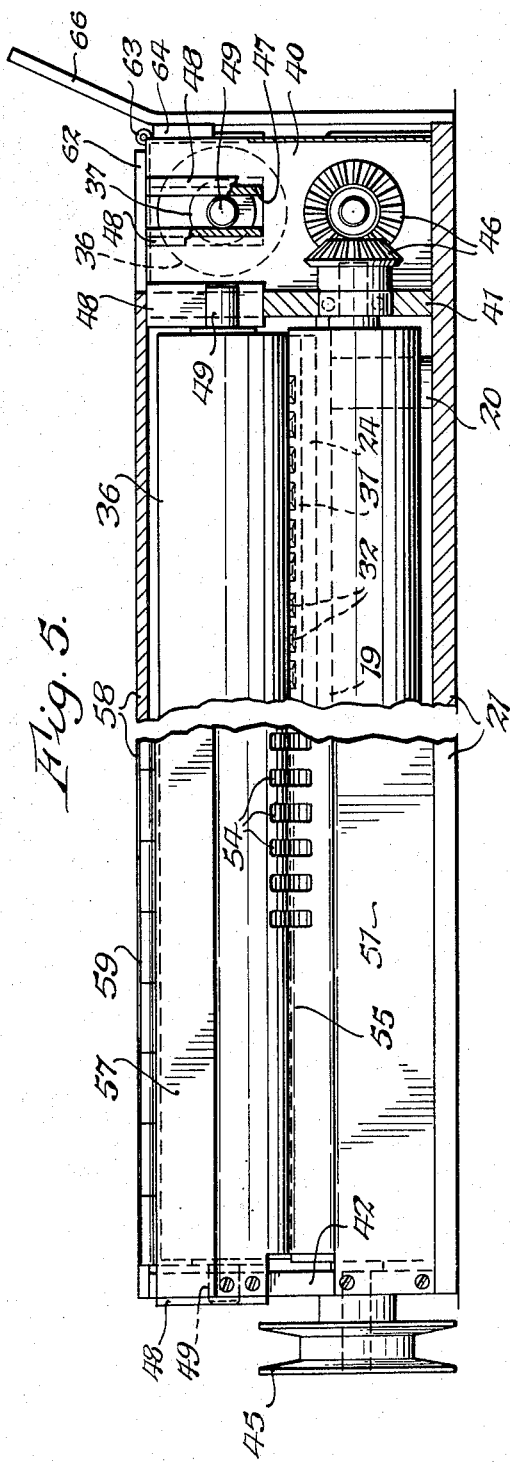
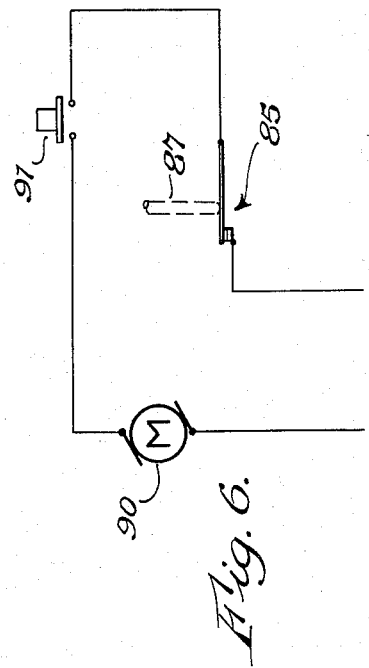
INVENTORS
Robert N. Youngblood
William J. Kluge
BY
Parker Prochnow Harmon
Attorneys.

Patented May 1, 1951

2,550,898

UNITED STATES PATENT OFFICE 2,550,898

MACHINE FOR USE IN MAKING FABRICS

Robert N. Youngblood, Snyder, and William J. Kluge, Buffalo, N. Y., assignors, by mesne assignments, to Sterling Molders, Inc., Buffalo, N. Y., a corporation of New York Application May 15, 1947, Serial No. 748,284

1 Claim. (Cl. 29—241)

This invention relates to machines for use in connection with the making of fabrics comprising a plurality of substantially rigid units or articles connected by tapes or cords.

One of the objects of this invention is to provide a machine on which the units to be connected by the tapes or cords are positioned and which has means for propelling the tapes or cords to pass them through apertures in the units for assembling the units and tapes into a fabric. Another object of this invention is to provide a machine of this kind with rolls by means of which the tapes may be rapidly fed to the units, and guide means which guide the tapes into correct relation to the units. Another object of this invention is to provide a machine of this type in which a base or support carrying the units may be readily positioned in the machine in correct relation to the rolls and guide means thereof. A further object is to provide a machine of this type with a removable cover or platen for the units by means of which the units are held in correct relation to each other during the feeding of the tapes through the same. A further object is to provide a machine of this type with stop means for limiting the movement of the tapes after passing through the units. It is also an object of this invention to provide a machine of this type which may be readily adapted to operate on fabrics of various sizes. A further object is to provide a machine of this type with guide means for the tapes including a removable part which will be readily deflected out of its operative position when a tape or cord becomes buckled due to not passing through the holes in the units, and whereby such tape may be readily removed from the machine. It is also an object of this invention to provide a machine of this kind with guide means which is formed to facilitate the feeding of the tapes to the rolls. A further object is to provide a machine of this type with guide means for accurately positioning the tapes before entering and after leaving the rolls so that they will be accurately fed to the units.

Other objects and advantages of this invention will appear from the following description and claim.

In the accompanying drawings:

Fig. 3 is a fragmentary top plan view thereof, partly in section, on line 3—3, Fig. 2, showing the machine with the top platen thereof removed.

Fig. 4 is a fragmentary side elevation thereof, as seen along line 4—4, Fig. 1.

Fig. 5 is a fragmentary front elevation thereof.

Fig. 6 is a diagram of electrical connections between the parts of the machine.

Figure 1:
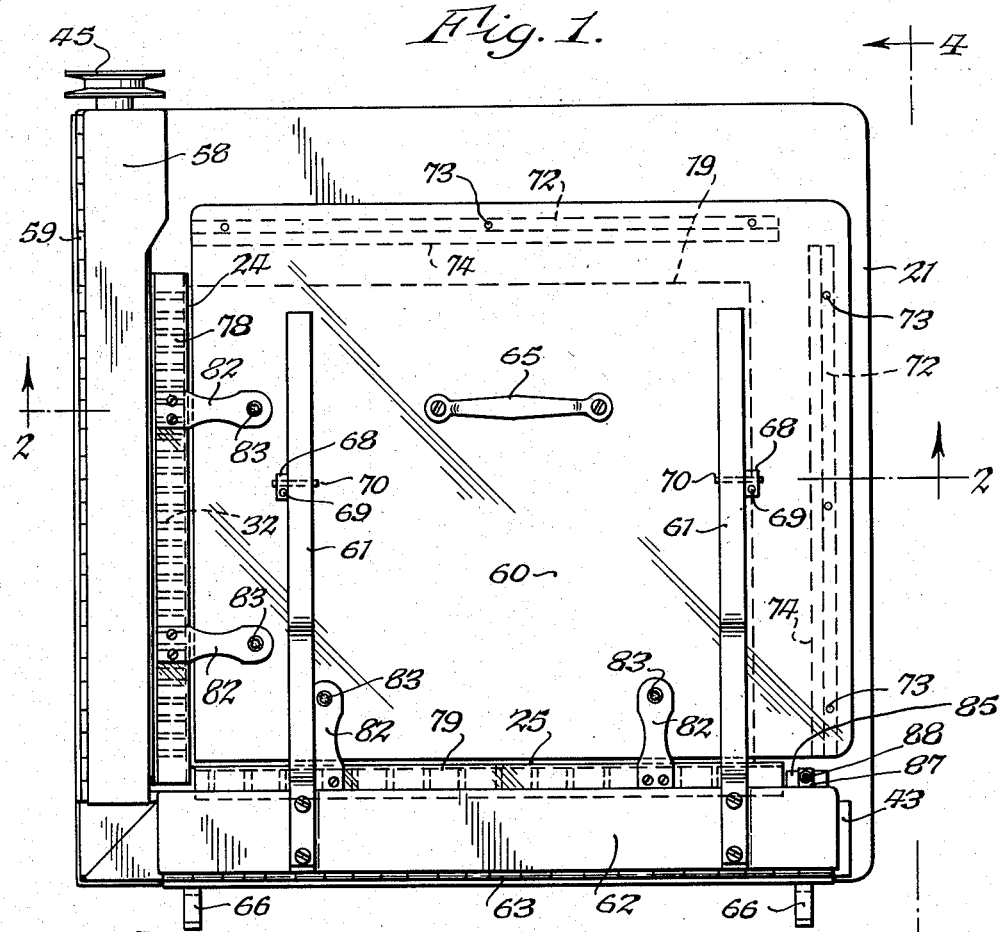
Fig. 1 is a top plan view of a machine embodying this invention.

This machine is adapted to operate on devices for use in assemblying parts of fabrics, such as shown, for example, in the Youngblood and Errick pending application No. 748,283 filed May 15, 1947, in which application there is shown and described in detail certain parts with which our machine is adapted to cooperate and which are also shown in the accompanying drawings, such as a base plate 12 having suitable projections 14 secured thereto on which articles or units 16 to be assembled by means of tapes 18 are positioned, the units or articles 16 being provided with apertures in the sides thereof through which the tapes or cords may pass. In fabrics of this type, the relative rigid units 16 may be made of molded plastic material or of metal. Fabrics of this type are used in connection with the manufacture of ladies' hand bags, and other ornamental articles. It is not intended, however, to limit this invention to use in connection with the manufacture of fabrics of this type, since it will be obvious that machines embodying this invention may be used in connection with the assembly of other fabrics, materials, or articles. The word "tapes" is herein employed to designate any flexible bands, threads, cords or strips of material employed for securing the units of the fabric in the desired relations to each other. The tapes which are preferably used are made of a textile fabric which is preferably impregnated and/or coated with a suitable plastic material to impart a certain amount of stiffness thereto, so that they may be readily pushed through the holes in the units.

The machine illustrated by way of example in the drawings includes a suitable support, such as a supporting plate 19 for the base 12 on which the units or articles to be assembled are positioned, and this supporting plate 19 may be mounted by means of posts 20 on a base plate 21 of the machine. The supporting plate 19 has mounted thereon suitable stop means for accurately positioning a base 12 thereon, such for example as a pair of positioning strips 24 and 25 shown in Figs. 2 and 4 respectively, which are accurately located on the machine and against which two adjacent edges of the units supporting base 12 may be abutted for the purpose of positioning the base 12 with the articles mounted thereon in correct relation to the machine. Stop means of any other suitable type may be employed for this purpose. Upon these positioning strips 24 and 25 are mounted suitable guide means for correctly guiding the tapes while they are passing to the units mounted on the base plate 12, and these guide means in the particular construction illustrated are in the form of plates, one of these plates 27 having guide grooves 28 recessed in the upper faces thereof. These guide grooves 28 having flaring tape-receiving portions 29 which converge to guide the tapes so that the leading ends thereof will pass through the various apertures 30 formed in the units to be connected. This plate 27 is located along one side of the article supporting base 12. Another guide plate 31 having similarly formed recesses 32 in the upper face thereof is arranged along the adjacent edge of the units supporting base plate 12. In the guide plate 31, the recesses or grooves 32 in the upper face thereof are spaced more closely together than the grooves 28 in the guide plate 27.

The units employed in the fabric illustrated in Fig. 3 are of substantially rectangular form and approximately the dimensions of half a square and, consequently, the tapes entering from the left side of Fig. 3 enter the narrow ends of the units and the grooves 32 in the plate 31 are spaced together more closely than the guide grooves 28 in the plate 27 which guide tapes into the relatively wide sides of the units. If units of different shapes are to be assembled, the plates 27 and 31 may be replaced by plates having guide slots arranged therein to correspond to the holes in such other units.

The tapes or cords used in connecting the units may be fed so as to be threaded through the holes in the units in any suitable or desired manner, and in the construction illustrated, we have provided two pairs of rolls, one for cooperation with the guide plate 27 and the other pair for cooperation with the guide plate 31. Each of these pairs of rolls includes a lower roll 35 and an upper roll 36 resting upon the lower roll. These rolls may be of any suitable or desired material. We have found that very satisfactory results are obtained if the lower roll 35 is made entirely of metal and the upper roll is covered with rubber or similar elastic material mounted on a metal core 37.

The rolls may be journalled on the machine in any suitable or desired manner, and in the construction illustrated, the base 21 of the machine is provided with upwardly extending webs or bearing supports 40 and 41, see Fig. 3, which are located at the adjacent ends of the two pairs of rolls. The other ends of one pair of rolls terminate adjacent to an end wall or upright bearing support or plate 42 and the other pair of rolls terminate adjacent to an upstanding plate or bearing support 43, Fig. 1. Suitable bearings are provided in these bearing supports in which the lower rolls 35 of each pair are suitably journalled to rotate about fixed axes. Preferably only the lower rolls are positively driven by any suitable means, for example, one of these rolls may be driven by means of a belt (not shown) passing over a pulley 45 located at the one side of the machine and secured to one of the lower rolls. The belt may, of course, be driven in any suitable manner, for example, by means of an electric motor (not shown). The two lower rolls 35 are connected by any suitable driving connection, such for example, as bevel gears 46, see Fig. 3, so that both rolls are driven from power supplied to the pulley 45. Any other means may be provided for driving the rolls.

The upper rolls 36 of each pair need not be positively driven and preferably rest by gravity upon the lower rolls 35. For this purpose, the upright plates or walls in which the bearings for the lower rolls are mounted are provided with upright slots 47. Channel members 48 fit about the upright edges of the slots 47 and the reduced ends or trunnions 49 of the rolls 36 fit between these channels and are freely rotatable and also free to move up and down between the channels, thus permitting the upper rolls to rest freely upon the lower driven rolls 35. The rolls are so positioned that the tapes may be passed between the rolls from two sides of the machine, the rolls rotating in a direction to move the tapes toward the guide slots 28 and 32 for further passage through the apertures of the units mounted on the unit supporting base 12. Rolls of any other suitable construction and other means for driving the rolls may be provided, if desired.

The machine is provided along two sides thereof adjacent to the two pairs of rolls with suitable side walls 50 and 51 extending in close proximity to the rolls. These side walls also form entrance guides for the tapes, by means of which the tapes can be easily fed to the rolls. The side wall or entrance guide 50 is provided with suitably spaced apertures 53 arranged accurately in alignment with the guide grooves 29 of the guide plate 27 and the side wall or entrance guide 51 is provided with suitable apertures 54 in alignment with the grooves or recesses 32 in the guide plate 31. These side walls or entrance guides are preferably provided at the apertured portions thereof with indented or recessed parts 55 which extend toward the bight of the two pairs of rolls and these recesses help to guide the tapes into correct relation to the apertures in the side walls through which the tapes must pass to the rolls.

The side wall 51 preferably terminates at its upper edge in a wall member 57 which supports a cover plate 58 for one of the pair of rolls. This cover plate is readily removable to afford access to the rolls, and in the particular construction shown, the cover plate 58 is connected with the side wall member 57 by means of a hinge 59. Any other suitable means for enclosing this pair of rolls may be employed, if desired, so that they may be readily accessible, and so that the upper roll may be readily removed, if desired, by sliding the trunnions thereof upwardly through the open-ended slots 47.

Since the units 16 to be assembled may be very light in weight, this being particularly true if they are made of plastic materials, it is desirable to provide means for holding the units 16 on the projections 14 of the unit supporting base plate 12, and for this purpose, we provide a plate or platen 60 which is arranged to lie upon the units 16 when the machine is in operation. This plate may be made of any suitable or desired material, but is preferably made of glass or other transparent material, so that the work can be observed during the assembling of the same. This platen must be readily removable to permit the units and the supporting base 12 therefor to be removed from the machine, and consequently, the platen may either be removed and replaced manually, or the platen may be movably mounted on the machine in any desired manner. In the construction shown by way of example, we have mounted this platen on a pair of bars or arms 61. These arms are preferably rigidly secured to a cover plate 62 for the second pair of rolls, this cover plate being connected by means of a hinge or hinges 63 to an upright side wall member 64 arranged above the entrance guide 59. The platen 60 may for convenience be provided with a handle 65 by means of which the platen may be readily swung about the hinges 63. 66 represents suitable stop bars to limit the swinging of the bars 61 with the glass platen secured thereto, the lower ends of these bars being secured to the side of the machine, and the upper portions thereof extending above the hinge member 63 into position to engage the cover plate 62 to limit the swinging of the same. As will be readily seen upon inspection of Fig. 4, the glass platen 60 may be easily swung from the full line position shown in Fig. 4, into the broken line position in which the lid or cover 62 for one of the pair of rolls rests against the stop bars or rods 66.

Figure 2:
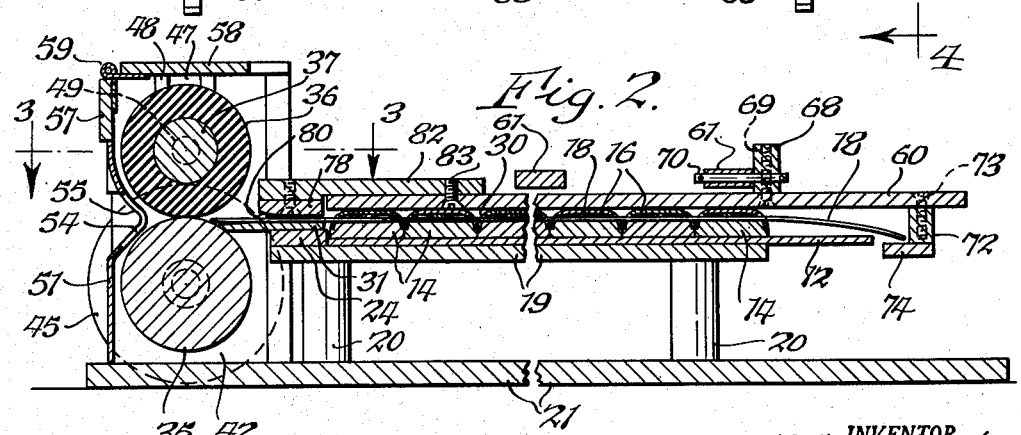
Fig. 2 is a fragmentary sectional elevation thereof, on an enlarged scale, on line 2—2, Fig. 1.

It is, of course, desirable that the platen 60 rest flatly upon the various units to be assembled, and for this reason, the bars 61 are preferably pivotally secured to the platen 60 in any suitable or desired manner. For example, as shown in Figs. 1, 2 and 4, posts 68 are preferably mounted to extend upwardly from the upper surface of the platen 60, for example, by means of screws 69 passing upwardly through apertures in the platen 60 and having a threaded engagement with the posts 68. Pivot pins 70 extend through the posts 68 and the arms 61 and thus form a pivotal connection between these arms and the platen 60 which permits a limited swinging movement of the platen relatively to the arms so that the platen can securely seat itself upon the units 16 to be assembled. The pivot pins engage the arms 61 intermediate of their ends, so that the platen 60 can swing only to a limited extent relatively to these arms.

Since the rolls 35 and 36 may be driven at relatively high speeds for quick assembly of the work, it is preferable to provide stop means for limiting the movement of the taps 18. Any suitable means may be provided for stopping the movement of the tapes after they have passed through the work, and in the particular construction shown for this purpose, stop bars 72 are provided which are secured to the platen 60 by means of screws 73. Preferably a lower plate 74 is secured to each of the stop plates 72 so as to prevent the ends of the tapes 18 from being deflected downwardly past the stop bars 72. These stop plates may, of course, be mounted on any other suitable part of the machine, such for example as the base plates 12, or the machine base 21. It is preferable, however, to mount them on the platen 60 since when the platen is swung upwardly and into its inoperative position, the stop bars will be out of the way and thus not interfere with the positioning of work on the machine. Since the machine may operate on work of different sizes, the stop bars may be mounted on different parts of the platen 60 by providing additional holes in the platen 60 through which the screws 73 may pass for securing stop bars thereon. For example if smaller fabrics are to be produced with shorter tapes, stop bars may be employed in the space between the platen 60 and the base 12, in which case the bars would be of slightly less height than the bars 72, so as to fit between the platen 60 and the base 12 and the lower plate 74 may in that case be omitted.

Means are also provided to fit over the grooves 28 and 32 in the guide plates 27 and 31 respectively for the purpose of closing the upper ends thereof to confine the tapes or cords within these grooves. In the construction shown, a pair of guide bars or lower plates 78 and 79 are employed which have lower surfaces which fit over portions of these grooves to form tapering chutes with converging walls and through which the cords or tapes may pass. These cover plates are preferably provided at the outer edges thereof with rounded, beveled or inclined surfaces 80, see Fig. 2, which would tend to deflect the leading ends of any tapes striking these surfaces downwardly into the chutes or channels. The guide or cover plates 78 and 79 may be rigidly secured to the platen, or as shown in the drawings, they may be mounted so as to be readily removable from their operative positions and so as to be lifted in case a tape does not pass through the holes of the units and become buckled within the chutes or grooves. In the construction illustrated, we have shown the cover plates or bars 78 and 79 movably mounted at two adjacent edges of the platen 60, for example, by means of flexible strips 82 which act as hinges and which may be made of relatively soft, pliable plastic material or rubber. One end of each of these strips is secured to one of the plates or bars 78 or 79 and the other ends of these strips may be suitably secured to the platen 60, for example by means of screws 83.

In the operation of these guide bars or cover plates 78 and 79 when the platen 60 is swung about its pivot, these plates or bars move with the platen 60 and into inoperative positions and thus expose the guide grooves 28 and 32. When the platen 60 is lowered into its operative position, these bars 78 and 79 will lie on the slotted plates 27 and 31 and cooperate with these slotted plates to guide the tapes or cords into operative relation to the units 16. If any tape strikes an obstruction which prevents passage of the same through the holes in the units, the tape will buckle upwardly out of its guide groove or raise the cover plate 78 or 79 or the platen 60, so that the operator can immediately see the difficulty and can raise the plate 78 or 79 and remove the buckled tape or cord. It is also possible for a portion of a tape when buckled, to pass upwardly in the space between a cover plate and the adjacent upper roll 36, in which case it is also readily visible and can be removed.

The machine is preferably provided with means for ensuring that the rolls will not be driven when the platen 60 is raised to replace a base 12 having the units assembled into a fabric with another base having the units mounted thereon ready for the tapes. If the device is to be driven by an electric motor, a switch 85 is preferably provided which may be mounted on the base plate 21 of the machine and which has a button 86 which closes the circuit when depressed, and which is normally in open circuit position when the switch button is not depressed. The hinged top 62 is provided with an arm 87 rigidly secured thereto and having an adjusting screw 88 arranged in the end thereof which may be adjusted so as to move the switch button 86 into circuit closing position when the platen 60 is lowered into its operative position. Consequently, when the platen with the cover member 62 is raised into the broken line position shown in Fig. 4, the screw 88 releases the switch button 86 and opens the circuit through the switch.

This construction has the further advantage that the circuit will not be closed if the units are not properly arranged on the base 12. For example if a unit is not properly seated on its projection 14, or if two units are placed on a single projection the platen will not move fully to its operative position, and if the adjusting screw 88 is properly adjusted, the circuit will not be closed, thus making the machine inoperative until the correction is made.

In Fig. 6 is shown diametrically a wiring circuit which may be used when the machine is driven by means of an electric motor 90. In this figure, 91 represents any suitable hand operated switch for controlling the supply of current to the motor. In this diagram, the switch 85 shown diagrammatically is closed by the arm 87. Consequently, both the switches 91 and 85, which are connected in series with the motor, must be closed in order to supply electric current to the motor, and if either switch is open, the motor will not operate. Other means for operating the rolls may be provided, if desired.

In the operation of the machine to assemble units into a fabric, a plurality of base plates 12 is preferably provided and the units 16 are mounted on these plates in the desired arrangement while the plates are removed from the machine, although it is, of course, possible to place the units on the base 12 while the same is in the machine. After the base 12 has been properly positioned in the machine against the stops 24 and 25, the platen 60 is swung on the hinges 63 into lowered position and allowed to rest by gravity on the top of the units. This also causes the guide bars or plates 78 and 79 to rest on the upper faces of the grooved guide members 27 and 31. The tapes are then fed one at a time into the guide holes 53 and 54. These rolls will, consequently, feed the tapes rapidly into the guide grooves provided in the plates 27 and 31, and it will be noted that the outer edges of these plates extend into close proximity to or into contact with the lower feed rolls 35, so as to guide the tapes from the rolls into the guide grooves. The guide channels or chutes formed by the grooves 28 and 32 and by the guide bars 78 and 79 converge or taper toward the discharge ends of these guide channels, and consequently, guide the tapes accurately toward the holes in the units. It is, of course, desirable to hold the tapes approximately at right angles to the guide rolls when feeding them through the apertures 54 and 55 so that they will require the minimum of deflection or bending by the guide channels. However, if a tape is fed to the rolls at an improper angle the guide channels cooperating with the inlet apertures 53 or 54, will straighten the tape, this being possible because the pressure exerted on the tapes by the upper rolls is slight, being due only to the weight of the upper rolls, which rest by gravity on the lower rolls. If the rolls operate at a relatively high speed, the tapes will also move at high speed, and in order to prevent the momentum of these tapes from carrying them so far that the trailing ends might pass out of some of the units, the stop members 72 will control the extent through which the tapes may be moved by the rolls. If a tape does not pass through some hole in one of the units through which it is intended to pass, the movement of such tape will be stopped and the tape will buckle in the guide groove in which it is located, or in the space between the upper roll 36 and the plate 78 or 79, there being no other place in which such tapes can buckle. This buckling will raise the plate 78 or 79, or platen 60, and thus signal the operator that the tape has not passed through the units. Such tape can then be removed by further raising the platen and/or guide bar 78 or 79 and removing the buckled tape.

While the machine is preferably provided with rolls for rapidly feeding the tapes through the apertures in the units, it will be obvious that if slightly longer tapes are employed, they may be fed through the guide means and the apertures in the units by hand.

If the fabric to be assembled is smaller than the maximum which the machine can produce, certain guide grooves of the machine will not be used, and the inadvertent use of such guide grooves can be readily prevented by pasting paper or tape over those apertures 53 and 54 which are not to be used. The tapes are, of course, cut of such length that they will be out of engagement with the feed rolls when in engagement with the stop 72 and if desired, the leading ends of the tapes may be rounded or tapered so as to facilitate their passage through the holes in the units. When the fabric has been assembled, it can be readily removed from the machine by first raising the platen 60 and then lifting the fabric from the projections 14 on the base 12, the ends of the tapes being free from the rolls and the stops 74.

While our improved machine has been shown in the drawings as comprising two sets of rolls for feeding tapes both lengthwise and crosswise of the fabric, yet it will be obvious that if desired, to produce elongated belt-like fabrics in which the tapes extend only in one direction, only a single set of rolls is necessary.

The machine described has the advantage that the tapes can be passed through the units of the fabric very rapidly, the machine being capable of operating just as fast as the operator can insert the ends of tapes into the guide holes or slots 54 and 55. The machine also has the advantage that the operator can readily see through the platen 60, if the same is made of glass, whether he has omitted any tapes, since portions of the tapes may be readily seen between the units as illustrated in Fig. 3. The machine has the further advantage that it is of relatively simple construction and all of the parts thereof are readily accessible.

It will be understood that various changes in the details, materials, and arrangements of parts which have been herein described and illustrated in order to explain the nature of the invention, may be made by those skilled in the art within the principle and scope of the invention, as expressed in the appended claim.

We claim as our invention:

A machine for cooperation with a base having arranged thereon a plurality of substantially rigid apertured units to be assembled by means of tapes passing through the apertures of said units, said machine including a platen mounted to swing about one side of said machine into and out of position to rest upon said units to hold the same in fixed relation to each other and to said base while tapes are being passed through the same, two pairs of rolls, the rolls of each pair being arranged one above the other and said pairs being arranged at two adjacent sides of said machine, means for driving the lower rolls of each pair, the upper rolls resting on said lower rolls and being driven therefrom by friction, guide chutes arranged adjacent to said rolls at the discharge sides thereof and in alignment with the apertures of said units, and members provided with entrance guide apertures arranged on the outer sides of said rolls for receiving tapes to be passed to said rolls, said guide apertures and said guide chutes being in alignment with said apertures in said units to guide tapes through said apertures in said units, said chutes being formed by grooves arranged in a plate and by a cover member arranged above said plate and closing the upper sides of said grooves, means for pivotally mounting said cover member to swing upwardly if a tape buckles in a chute, and means for stopping the movement of said tapes after they have passed through the apertures of said units.

ROBERT N. YOUNGBLOOD.
WILLIAM J. KLUGE.

REFERENCES CITED

The following references are of record in the file of this patent:

UNITED STATES PATENTS

| Number | Name | Date |
| --- | --- | --- |
| 840,799 | Paar | Jan. 8, 1907 |
| 1,306,337 | Hayden | June 10, 1919 |
| 1,680,044 | Hitchcock | Aug. 7, 1928 |
| 2,021,681 | Bright | Nov. 19, 1935 |
| 2,061,922 | Ross | Nov. 24, 1936 |
| 2,287,287 | Boltz | June 23, 1942 |